United States Patent [19]
Kawasaki

[11] Patent Number: 5,293,275
[45] Date of Patent: Mar. 8, 1994

[54] DATA RECOVERY SYSTEM FOR INFORMATION RECORDING MEDIA

[75] Inventor: Ken Kawasaki, Suwa, Japan

[73] Assignee: Seiko Epson Corporation, Tokyo, Japan

[21] Appl. No.: 622,862

[22] Filed: Dec. 5, 1990

[30] Foreign Application Priority Data

Dec. 5, 1989 [JP] Japan .................................. 1-316207
Nov. 22, 1990 [JP] Japan .................................. 2-319431

[51] Int. Cl.$^5$ ................................................ G11B 5/09
[52] U.S. Cl. ........................................... 360/51; 360/45
[58] Field of Search ............... 360/51, 45, 46; 331/17, 331/25; 375/99, 101

[56] References Cited

U.S. PATENT DOCUMENTS

| | | | |
|---|---|---|---|
| 3,900,890 | 8/1975 | Eibner | 360/51 |
| 4,376,268 | 3/1983 | Moriya et al. | 360/51 |
| 4,567,448 | 1/1986 | Ikeda | 331/25 |
| 4,811,125 | 3/1989 | Sengoku | 360/51 |
| 4,837,643 | 6/1989 | Tierney, III | 360/51 |

*Primary Examiner*—Donald Hajec
*Assistant Examiner*—Won Tai C. Kim
*Attorney, Agent, or Firm*—Raymond J. Werner

[57] ABSTRACT

A floppy disk recording data regeneration system having a voltage-controlled delay circuit, voltage-controlled data phase shifting circuit and a loop filter made up of a first-stage low-pass filter with a first cut-off frequency, and a second-stage low-pass filter with a second cut-off frequency lower than the first cut-off frequency. The output voltage of the second-stage low-pass filter drives the voltage-controlled data phase shifting circuit, and the output voltage of the first-stage low-pass filter drives the voltage-controlled delay circuit. The amount of delay of the oscillation output pulse is adjusted by the voltage-controlled delay circuit to suppress the occurrence of read errors in the event of peak shifts. In the event of a wow and flutter fluctuation, the amount of shift in the phase of the read data signal pulse is finely adjusted to suppress the occurrence of read errors in subsequent stages. In a data recovery system having this type of phase correction circuit, correction is also performed in the event of jitter due to the occurrence of power source fluctuations, and, therefore, countermeasures for suppressing power source fluctuations can be implemented relatively easily.

8 Claims, 11 Drawing Sheets

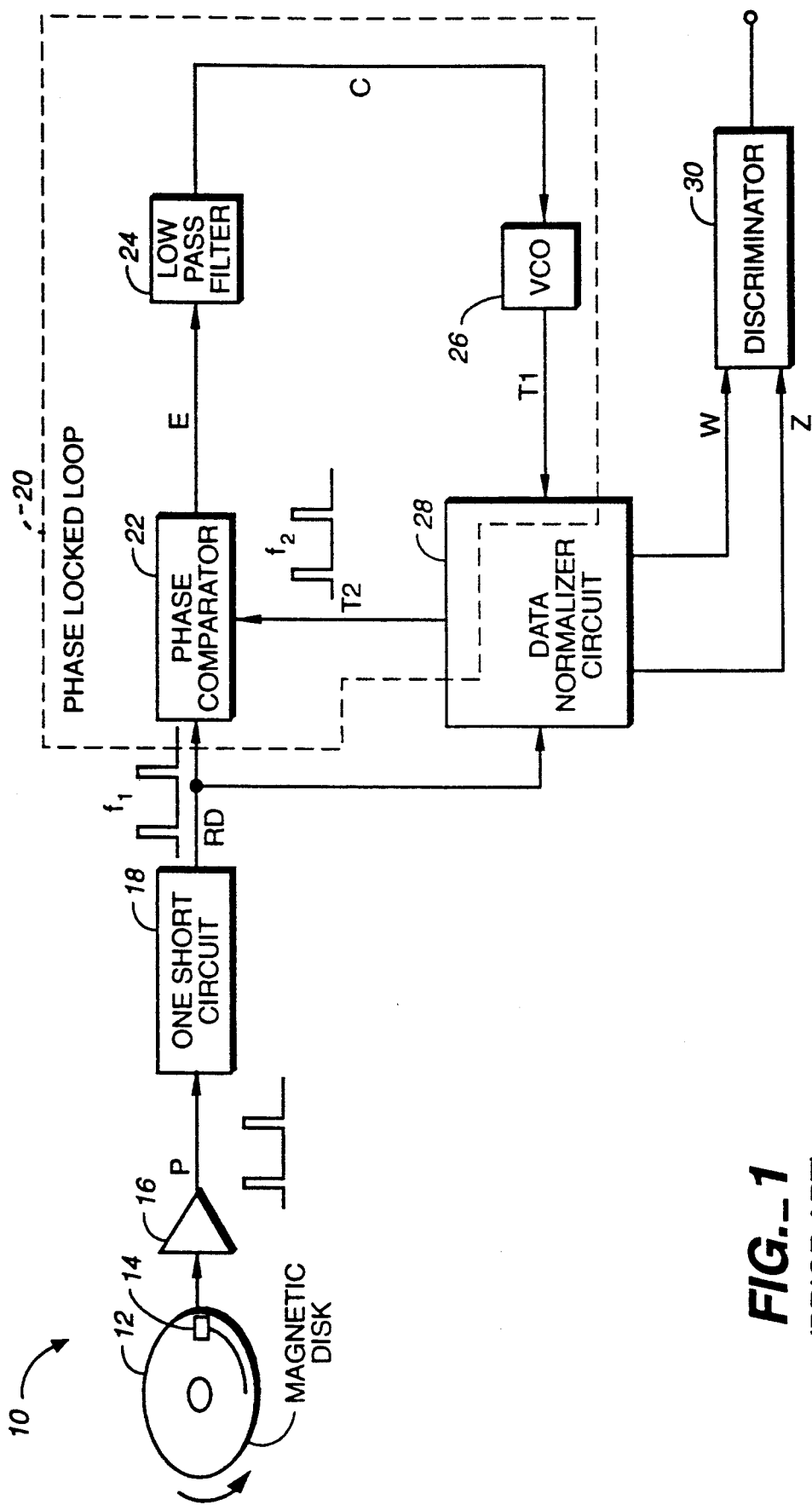
FIG._1 (PRIOR ART)

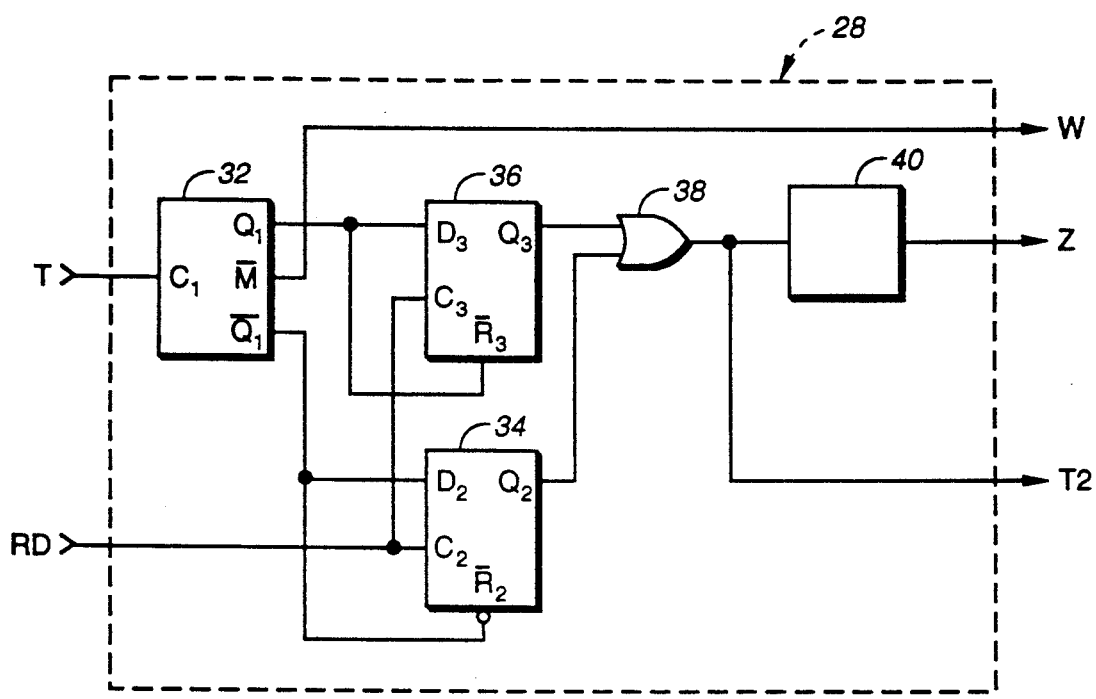
FIG._2
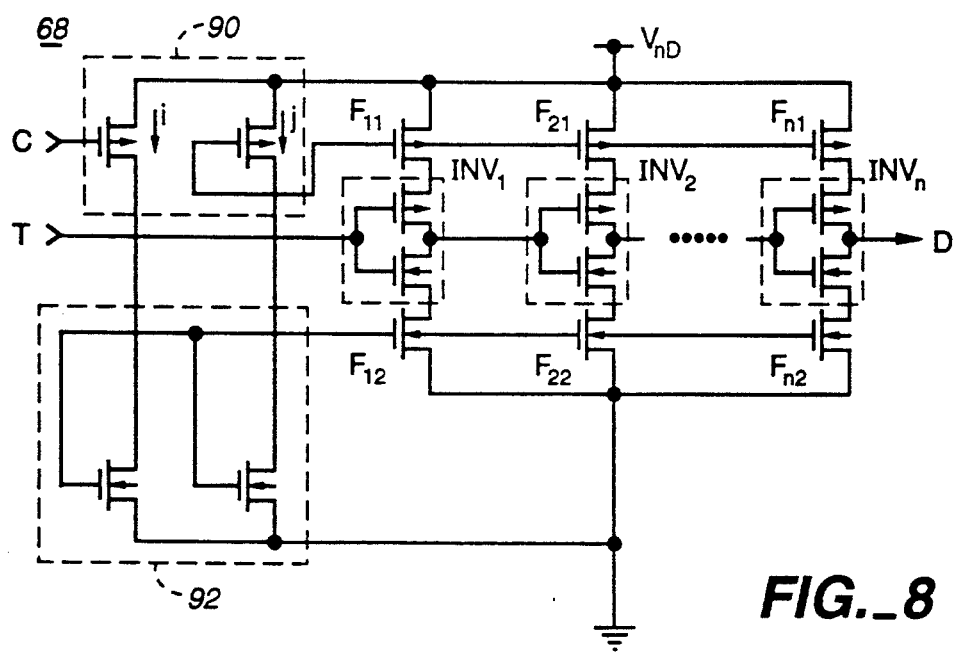
FIG._8

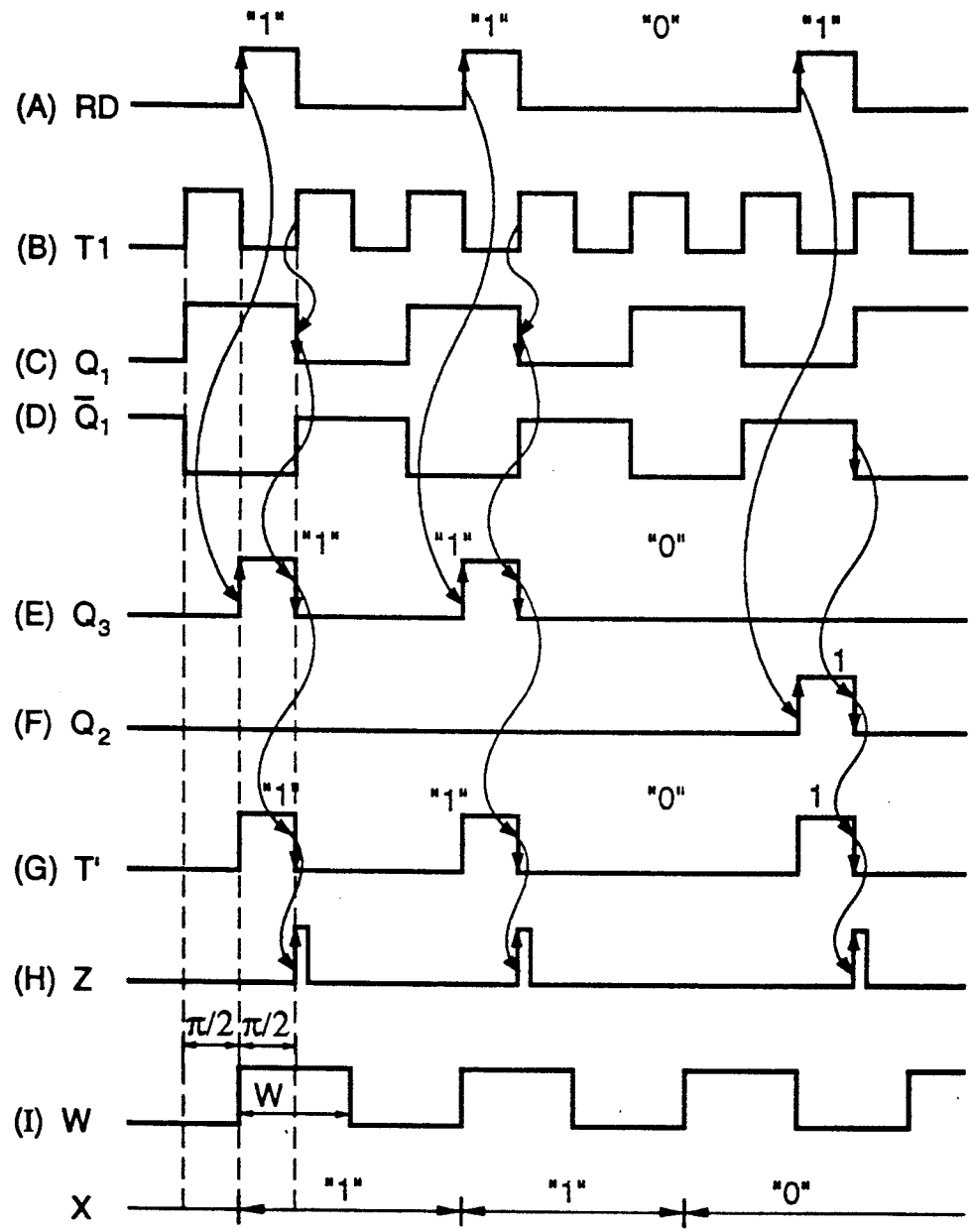
FIG._3

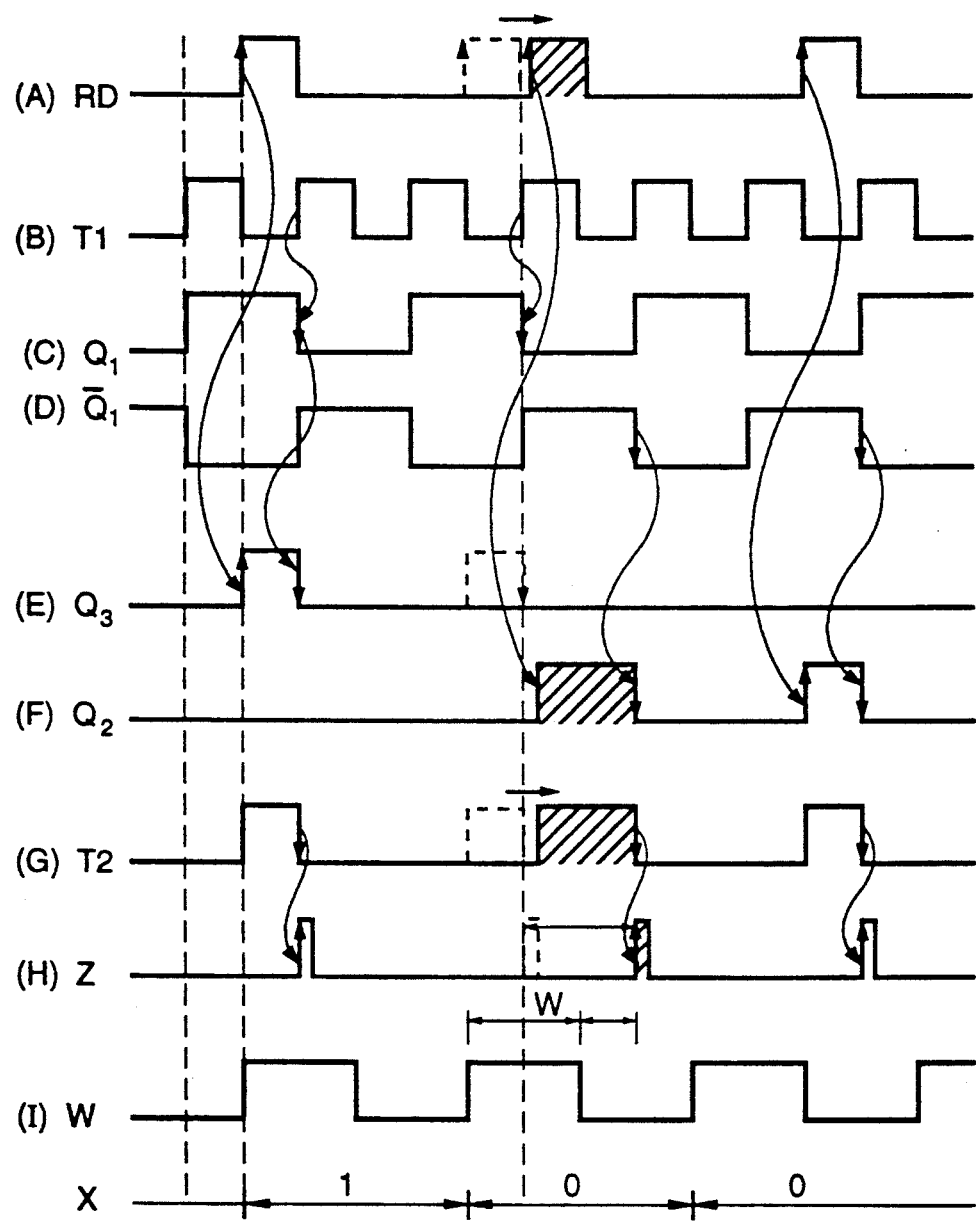
FIG._4

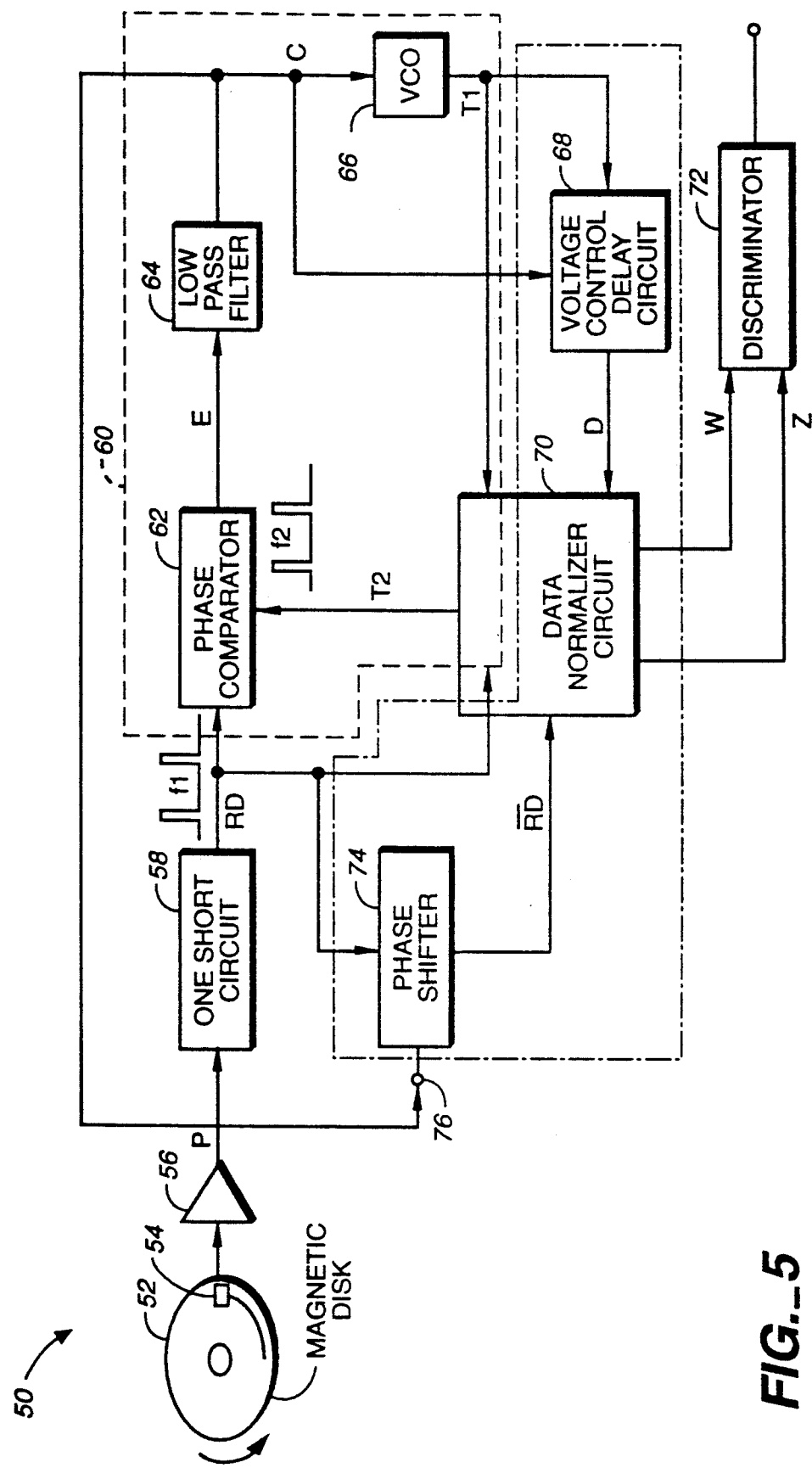
FIG._5

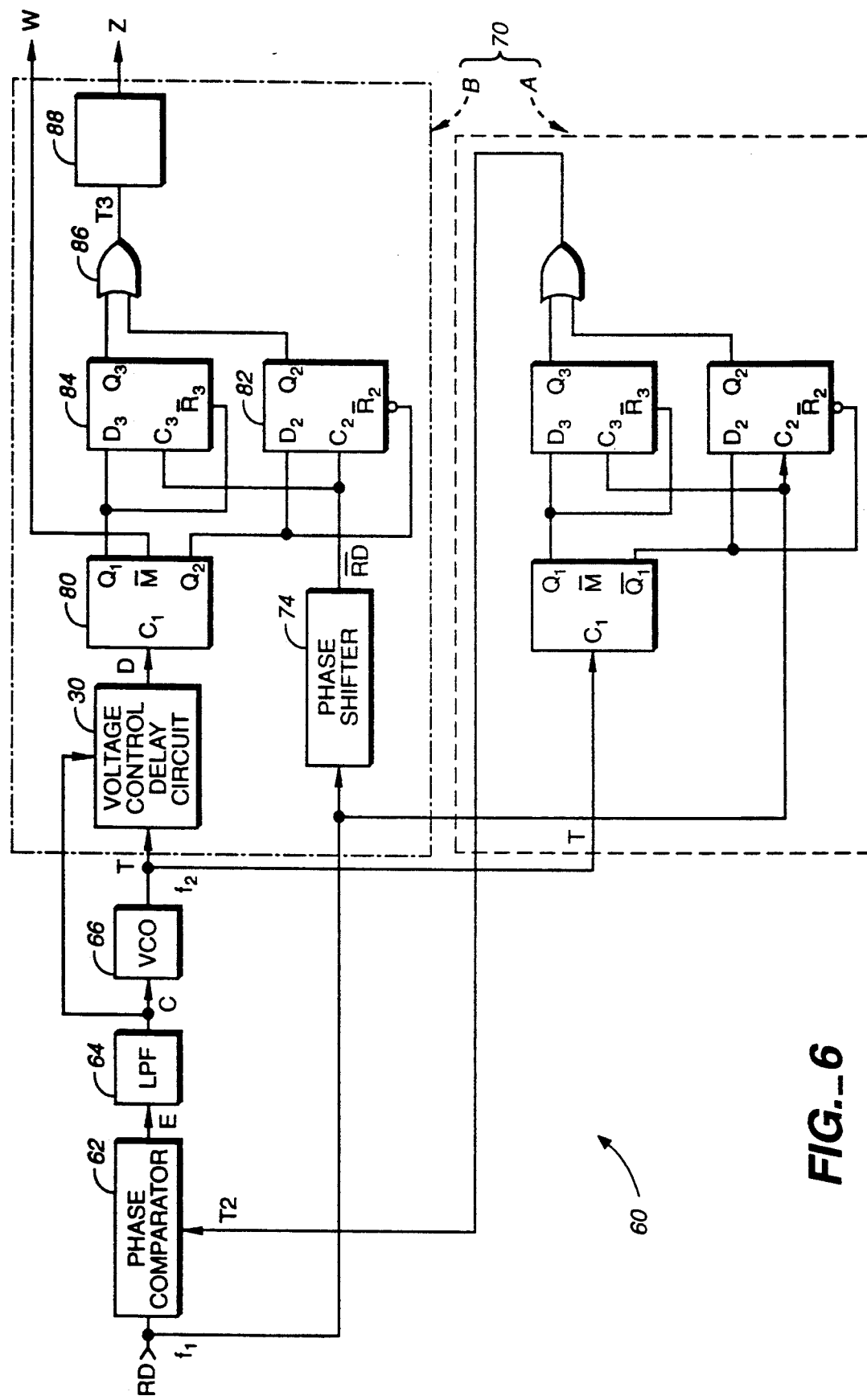
FIG._6

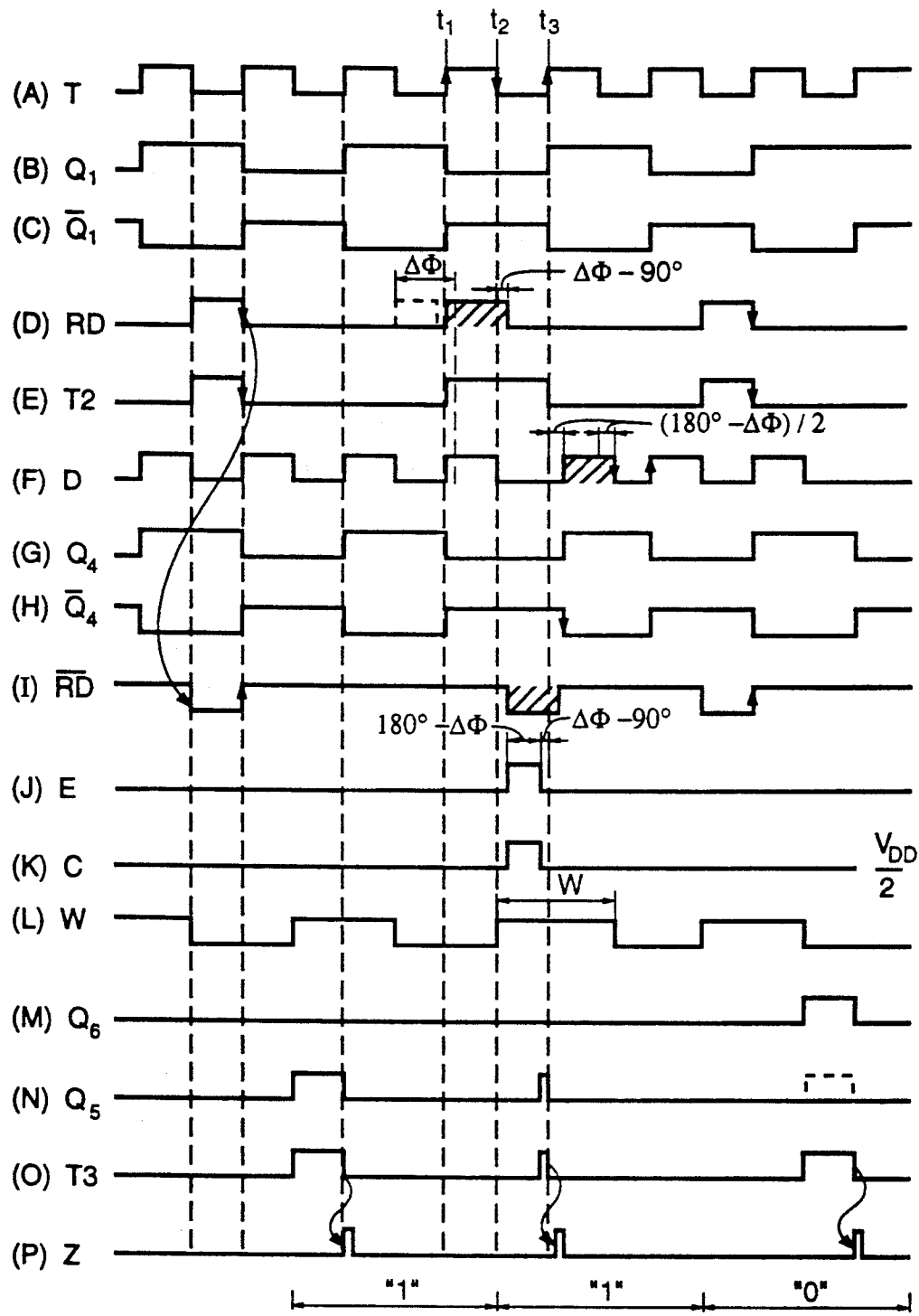
FIG._7

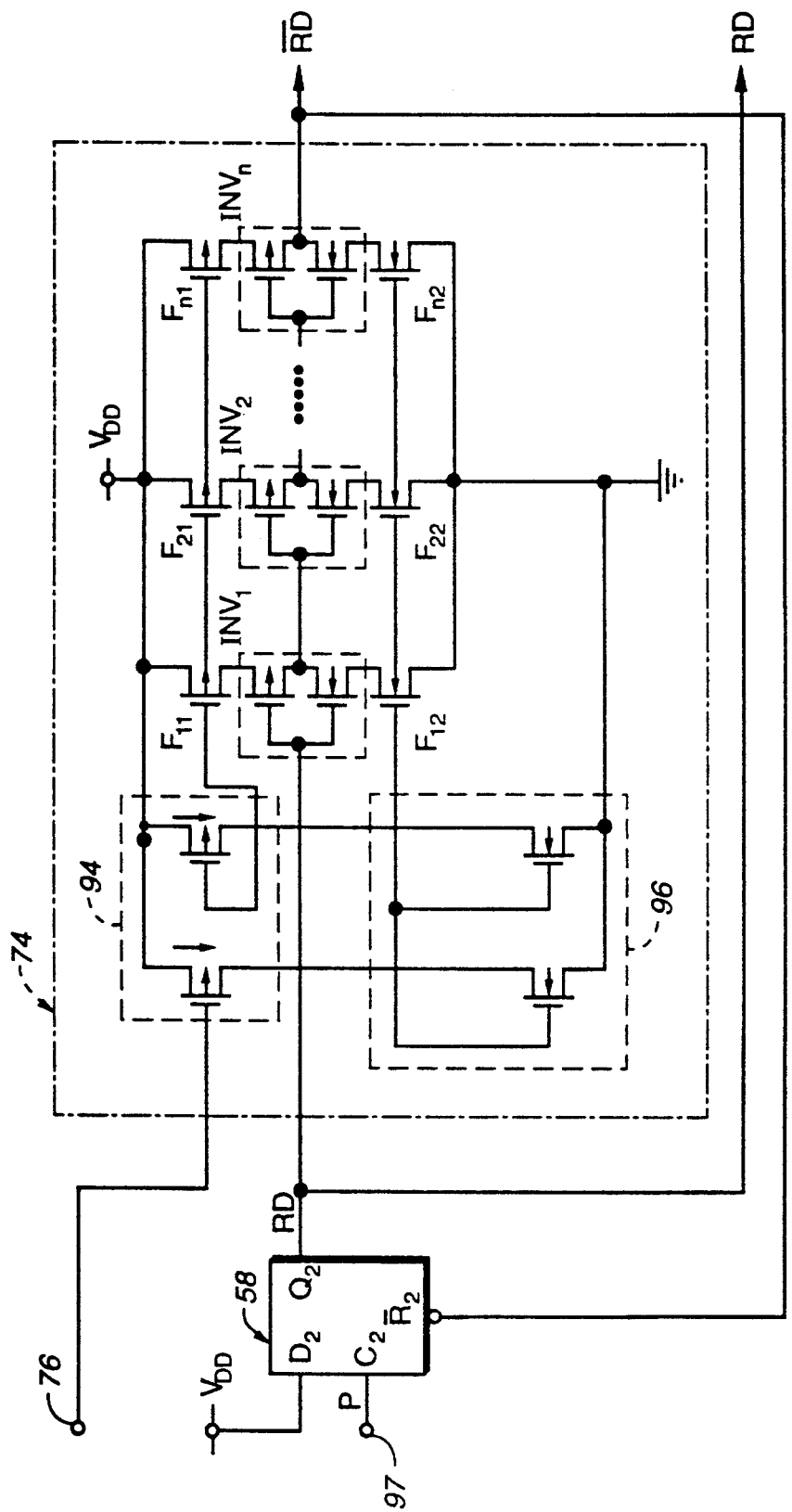
FIG._9

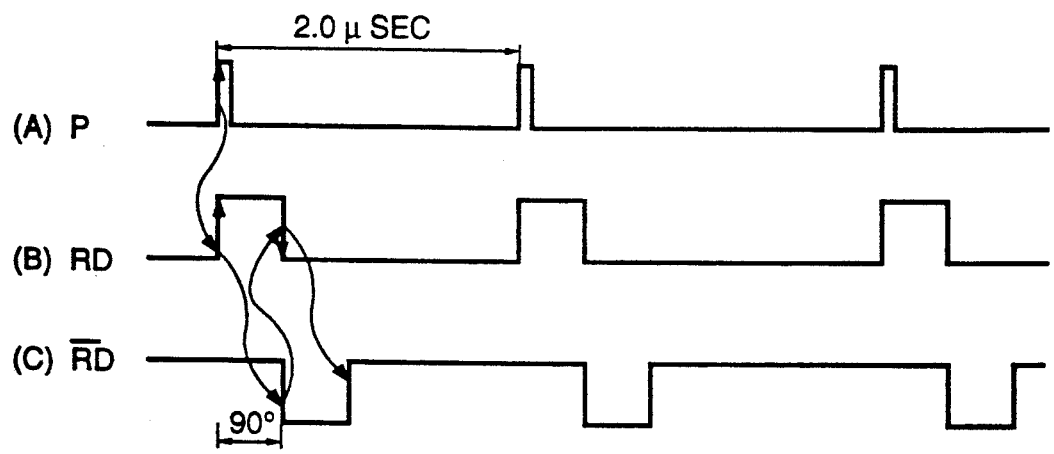
FIG._10
FIG._12
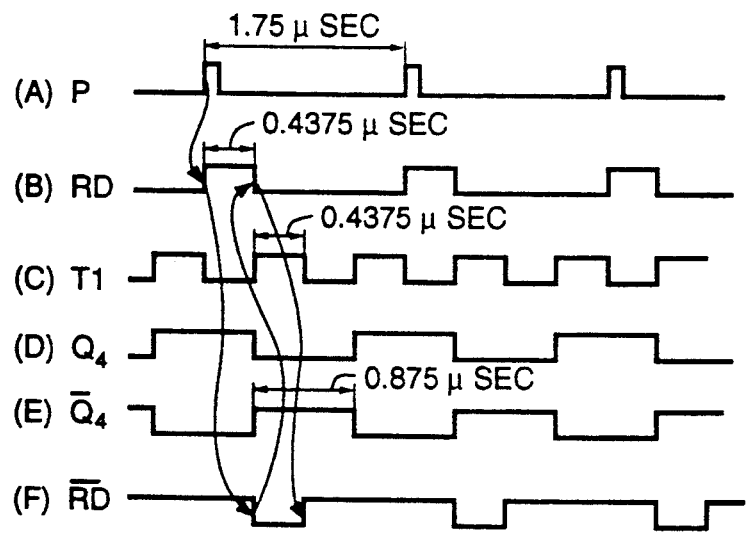
FIG._15

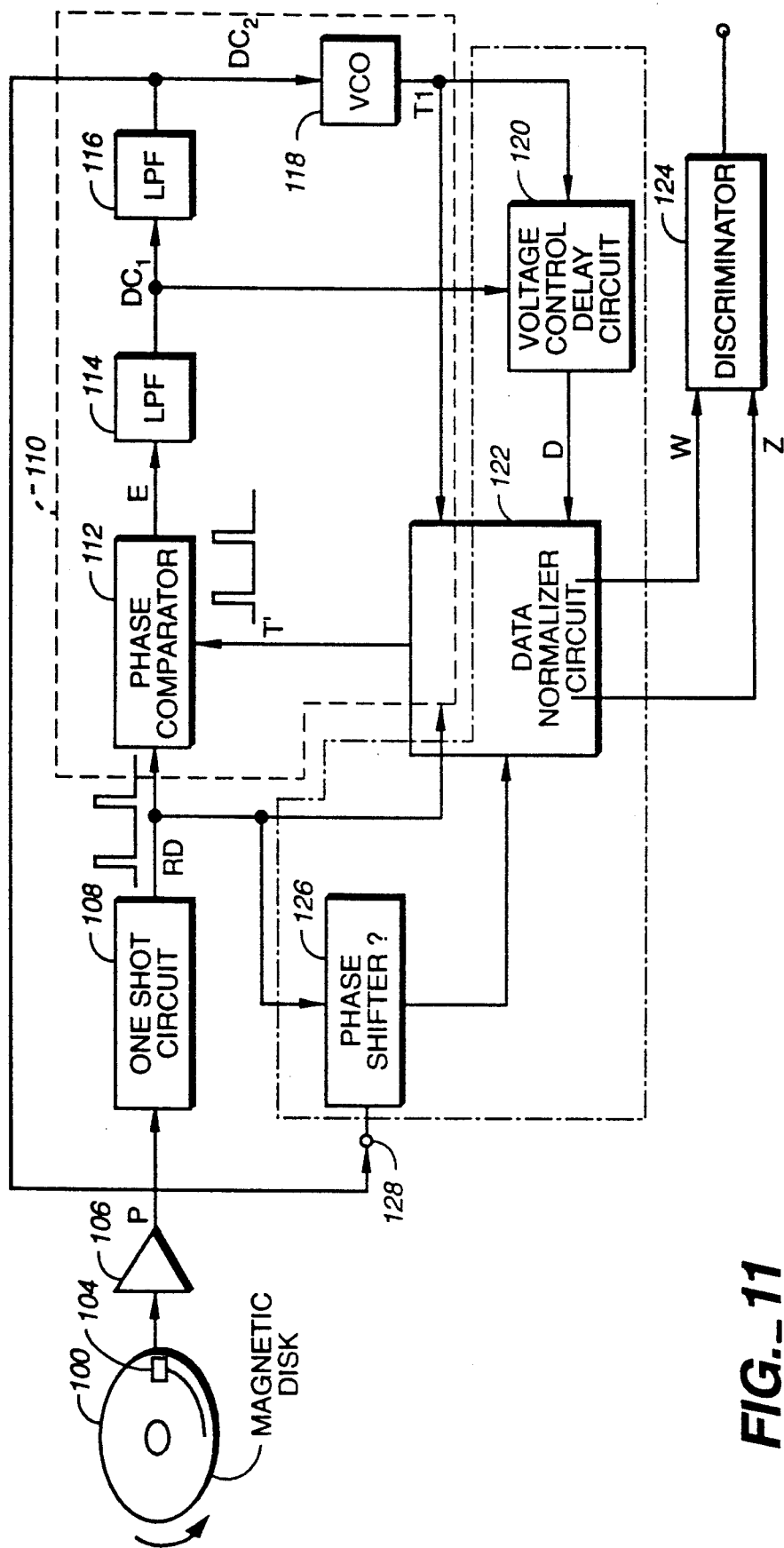
FIG._11

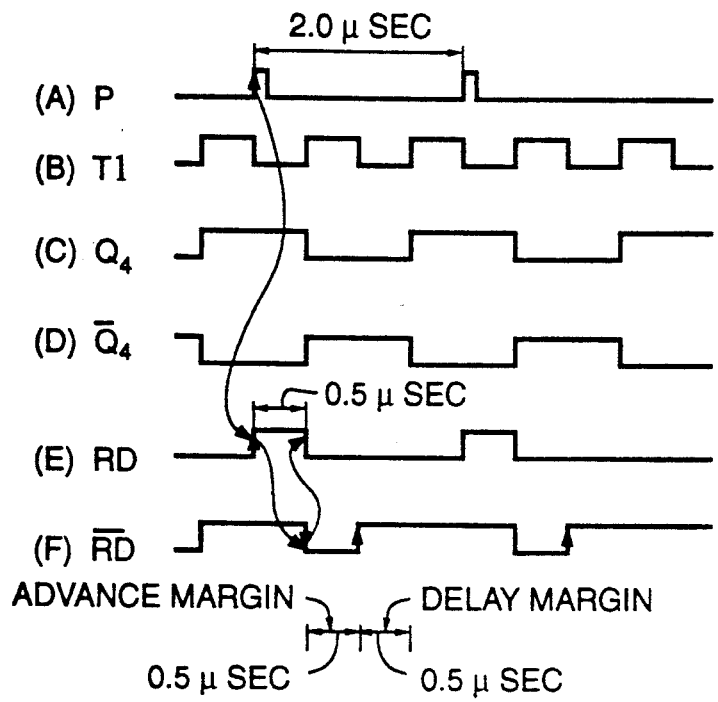
FIG._13
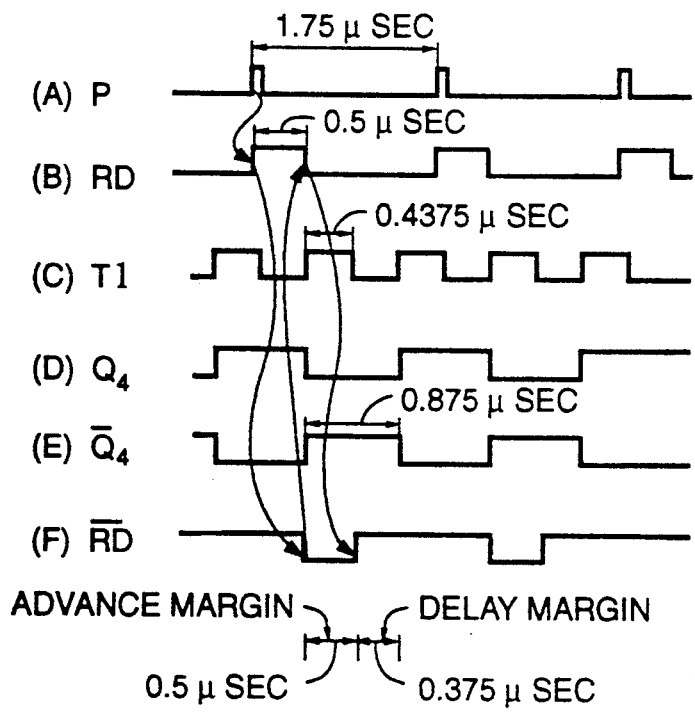
FIG._14

DATA RECOVERY SYSTEM FOR INFORMATION RECORDING MEDIA

BACKGROUND OF THE INVENTION

This invention relates to regenerators, data recovery, and data separator systems for information storage mediums such as magnetic floppy disk devices and more particularly to phase correction techniques for normalizing read data bits at a prescribed position in a detection window of a window signal.

FIG. 1 is a prior art regeneration system 10 for a floppy disk drive and comprises a floppy disk 12, a read/write head 14, a preamplifier 16, a one-shot multivibrator 18, and a phase locked loop (PLL) 20 having a phase comparator 22, a low-pass filter 24, and a voltage controlled oscillator (VCO) 26. System 10 is alternatively called a data recovery or data separator system by those skilled in the art. Phase comparator 22 employs a charge pump (not shown). An oscillating signal "$T_1$" is output by VCO 26 and input to a data normalizer 28. A read data (RD) signal (having a frequency "$f_1$") output by one-shot circuit 18 is also connected to normalizer 28. A signal "$T_2$" (oscillating at a frequency "$f_2$") is also generated at one half of the frequency of signal "$T_1$" by using a divider in data normalizer 28. A discriminator 30 extracts a signal "X" from a window signal "W" and a signal "Z". System 10 uses, for example, a modified frequency modulation (MFM) encoding scheme on floppy disk 12. One-shot multivibrator 18 functions to shape a waveform "P" from preamplifier 16 into signal "RD". Phase comparator 22 compares the phase of signal "RD" to synchronizing signal "$T_2$" and generates a phase error signal "E". Low-pass filter 24 functions as a loop filter, and produces a DC correction voltage "C" having a magnitude that is proportional to the phase error between "$f_1$" and "$f_2$" at comparator 22. VCO 26 varies the frequency of signal "$T_1$" up or down appropriately, depending on voltage "C".

System 10 works in the following way. If the frequency "$f_1$" of signal "RD" goes higher than average, due, for example, to low-frequency wow and flutter of floppy disk 12, a phase difference develops between frequencies "$f_1$" and "$f_2$". This causes a phase error signal "E" to be generated at the output of phase comparator 22. Low-pass filter 24 then filters and outputs this as correction voltage "C". Since VCO 26 is a voltage controlled oscillator, its output frequency is controlled by changes in voltage "C". The oscillation frequency "$T_1$", in this case, moves closer to two times "$f_1$", such that "$f_1$" approaches "$f_2$" (because "$T_1$" is divided by two). When "$f_1$" equals "$f_2$", comparator 22 produces a voltage that causes VCO 26 to oscillate at twice "$f_2$". equilibrium voltage will not necessarily be zero volts, and instead, will be dependent on the exact circuit design of VCO 26. The net result of the above is that a synchronizing signal (here "$T_2$") is obtained which will track wow and flutter induced fluctuations in signal RD.

FIG. 2 illustrates that data normalizer 28 typically comprises a divide-by-two divider 32, a pair of D-type flip-flops 34 and 36, a two-input OR-gate 38, and a one shot multivibrator 40. The output of VCO 26 (signal "$T_1$") is connected to the clock input $C_1$ of divider 32 and is divided by a factor of two at outputs $Q_1$ and $\overline{Q}_1$. A window signal "W", coming from master output $\overline{M}$ of divider 32, has a phase that is delayed one-half $\pi$ (90°) with respect to output $Q_1$. A flip-flop 34 receives signal "RD" at its clock input $C_2$ and has the inverted output $\overline{Q}_1$ of the divide-by-two divider 32 applied to both its data input $D_2$ and reset input $\overline{R}_2$. The data input of a flip-flop 36 receives signal "RD" at its clock input $C_3$ and has the output $Q_1$ of divider 32 connected to both data input $D_3$ and reset input $\overline{R}_3$. OR-gate 38 has two inputs, one of which is connected to output $Q_2$ of flip-flop 34 and the other of which is connected to output $Q_3$ of flip-flop 36. A negative edge-sensitive one-shot multivibrator 40 senses the falling edge of synchronizing signal "$T_2$" at the output of OR-gate 38, and generates a signal "Z" (comprising a stream of narrow pulses).

FIG. 3 shows the timing relationships among the various signals in system 10 and especially those in data normalizer 28. Flip-flop 36 demodulates signal "RD" and functions as an MFM decoder which separates out the desired data bit sequence. Flip-flop 34 functions to extract the so-called MFM clock bit. Output $Q_3$ corresponds to the data pulse sequence, and output $Q_2$ corresponds to the clock pulse and indicates the bit interval. Signal "RD" has a pulse width one-quarter of the fundamental period and is synchronized with signal "$T_1$". Output $Q_3$ of flip-flop 36 goes high if signal "RD" goes high while output $Q_1$ of divider 32 is high. Output $Q_3$ goes low immediately when output $Q_1$ goes low. Output $Q_2$ of flip-flop 34 goes high if signal "RD" goes high while the inverted output $\overline{Q}_1$ of divider 32 is high. Output $Q_2$ goes low immediately when output $\overline{Q}_1$ goes low. The outputs $Q_3$ and $Q_2$ are combined in OR-gate 38 and are synchronized with signal "RD" to generate synchronizing signal "$T_2$" having the same phase. Synchronizing signal "$T_2$" is input to multivibrator 40 and produces the narrow pulse width code sequence "Z". Each data pulse rise in signal "Z" is triggered by a falling edge of synchronizing signal "$T_2$" (and is not generated by the falling edge of signal "RD"). Since window signal "W" is the master output $\overline{M}$ of divider 32, the data pulse of code sequence "Z" appears at the center of a detection window width "w". In this way, the read data is normalized with respect to the window signal "W". The MFM code sequence (1101 . . . ), shown in FIG. 3, has the clock bit removed in a later stage and results in a demodulated code sequence (110 . . . ). Since data pulses in code sequence "Z" are produced from the edges of the output $Q_1$ and inverted output $\overline{Q}_1$, the phases of signal "RD" and synchronizing signal "$T_2$" are synchronized and the data pulse of code sequence Z is always generated at the center of detection window width "w" even while experiencing wow and flutter fluctuations (low-frequency fluctuations below one kilohertz). Normalizing the data pulse to be at the center of detection window width "w" is important since window signal W and code sequence Z can have different amounts of delay due to differences in cable wiring to discriminator 30. A sufficient phase margin in the data pulse must be designed-in to prevent it from deviating outside detection window width "w" as much as possible.

FIG. 4 shows the timing of each of the signals in data normalizer 28 when a large peak shift occurs in the signal "RD". PLL 20 is designed to follow wow and flutter fluctuations and other low-frequency fluctuations, and it generates synchronizing signals "$T_1$" or "$T_2$" by following frequency fluctuations in signal "RD". It also follows phase shifts (peak shifts) in the read data pulse that are randomly generated by magnetic interference between adjacent bits on the magnetic disk. When a peak shift occurs, such as that indicated by the hatched areas in signal "RD" in FIG. 4, a pulse rise occurs and output $\overline{Q_1}$ is high, rather than output $Q_1$ being high. The pulse which should occur in output $Q_3$ (as indicated by a dashed line in FIG. 4) is not generated, and, instead, a pulse in output $Q_2$ as indicated by the dashed line in FIG. 4, is generated. This results in the appearance of a pulse (hatched area) in code sequence Z in FIG. 4 which causes the bit to shift. Since this pulse with a shifted bit does not exist in detection window width "w" of the window signal, a recording code sequence for example of "110 . . . " will be incorrectly read as "100 . . . ". When a pulse with a large bit shift occurs, the oscillation frequency of VCO 26 will fluctuate, and synchronizing signal "$T_1$" ("$T_2$") which follows this phase delay is generated. This fluctuation of the synchronizing signal, with respect to the delayed peak shift, reduces the phase margin of the next read data pulse and causes it to shift more easily out of the detection window which causes read errors. An excessively large peak shift, as shown in FIG. 4, can easily occur due to a problem in the drive circuit, etc. However, when small peak shifts occur that are not large enough to cause a read error, PLL 20 tries to follow it, but if a peak shift in the opposite direction happens, a read error will probably result. In prior art circuit configurations, read errors result in the occurrence of peak shifts in rapid succession.

Phase shifts of 20° to 30° are normal in operation, and perfect synchronization is essentially impossible. Peak shifts occur randomly and usually comprise both low-frequency and high-frequency components. Since PLL 20 is designed to follow low-frequency wow and flutter (below approximately one kilohertz), it essentially follows peak shifts that have relatively low-frequency components. The advance and delay margins are generally not balanced, so a read error can occur due to mutual differences in the amounts of delay of the two margins in the discriminator. During normal operation, VCO 26 also has a jitter component due to the effects of power source fluctuations, so it is easy for read errors to occur, due to the reduced phase margin of peak shifts. In the prior art, it was necessary to carefully design the loop filter or devise such counter-measures as power source stabilization and noise reduction (cable wiring, parts layout on circuit substrate, etc.) to suppress power source fluctuations.

A phase correction circuit placed in a stage before the data normalizer will correct the phases of the read data signal and the oscillation output with respect to each other. The amount by which the phase is adjusted by the phase correction circuit is controlled by the voltage of the loop filter used in the phase synchronizing circuit. A more specific means for solving one of the above problems is to configure the phase correction circuit with a data phase shifting element for setting the VCO to a pull-in range that will follow only low-frequency fluctuations and for uniformly shifting the phase of the read data signal by only a prescribed amount, using a voltage-controlled delay element for variably adjusting the amount of delay of the oscillation output pulse of VCO according to the output voltage of the loop filter. The phase correction circuit can be configured with a voltage-controlled data phase shifting circuit for variably adjusting the amount of pulse phase shift of the read data signal according to the output voltage of the loop filter. A more specific means for solving the above problems simultaneously is to configure the loop filter with a first-stage low-pass filter having a first cut-off frequency and a second-stage low-pass filter having a second cut-off frequency lower than the first cut-off frequency, and to configure the phase correction element with a voltage-controlled data phase shifting circuit which variably adjusts the amount of shift of the pulse phase of the read data signal according to the output voltage of the second-stage low-pass filter, and with a voltage-controlled delay element that adjusts the amount of delay of the oscillation output pulse of the VCO according to the output voltage of the first-stage low-pass filter.

When the voltage controlled oscillator is set to a pull-in range that follows only low-frequency fluctuations, a phase-synchronizing element will not follow fluctuations containing high frequency components such as peak shifts and it mainly follows wow and flutter fluctuations. The occurrence of peak shifts varies the output voltage of the loop filter. Due to this voltage fluctuation, the voltage-controlled delay element adjusts the amount of delay of the oscillation output pulse coming from the voltage-controlled oscillator. That is, the amount of delay of the oscillation output pulse is controlled according to the phase of the peak shift. The phase of the read data signal, however, is uniformly shifted 90°, for example, by the data phase shifting element. This is because the pulse which delayed the oscillation output pulse and the pulse of the read data signal are combined. Using this combined signal processing, the data bit pulse in which a peak shift has occurred can be matched without deviation within the detection window width of the window signal in the data normalizer, whereby read errors due to peak shifts are reduced compared to prior art signal processing devices.

The problem of unbalanced phase margins in wow and flutter fluctuations not containing a high-frequency component such as peak shifts is improved by adjusting the phase of the read data signal pulse. By employing a voltage-controlled data phase shifting element as the phase correcting circuit which variably adjusts the amount of shift in the phase of the read data signal pulse according to the output voltage of the loop filter. A fine adjustment in the amount of phase shift is made in response to relatively small phase fluctuations, according to the amount of phase fluctuation, rather than large phase adjustments, such as for peak shifts. Therefore, it is possible to make the advance margin and delay margin of the data bit equal with respect to the window width. Differences between the data bit sequence and the delay of the window signal inevitably occur between the data normalizer and the discriminator in a later stage, but by making the advance margin and the delay margin equal in the data normalizer, the probability of discrimination errors (read errors) occurring is reduced.

An object of the present invention is to offer a highly reliabler regenerator for information recording mediums that will not easily produce read errors when relatively large phase shifts (having high-frequency fluctuations) occur in a read data signal. Another object is to offer a highly reliable regenerator for information recording mediums that makes it difficult for read errors to occur by continually balancing phase margins even when relatively low-frequency fluctuations occur due to wow and flutter fluctuations or power source fluctuations.

SUMMARY OF THE INVENTION

According to the present invention, a data recovery or regeneration system is disclosed that uses a voltage-controlled delay element and voltage-controlled data phase shifting element and has a loop filter made up of a first-stage low-pass filter having a first cut-off frequency and a second-stage low-pass filter having a second cut-off frequency lower than the first cut-off frequency. The output voltage of the second-stage low-pass filter is input to the voltage-controlled data phase shifting element, and the output voltage of the first-stage low-pass filter is input to the voltage-controlled delay element. The amount of delay for the oscillation output pulse is adjusted by the voltage-controlled delay element to suppress the occurrence of read errors in the event of peak shifts. In the event of a wow and flutter fluctuation, the amount of shift in the phase of the read data signal pulse is finely adjusted to suppress the occurrence of read errors in subsequent stages.

In a regenerator having this type of phase correction element, correction is also performed in the event of jitter due to the occurrence of power source fluctuations, and, therefore, countermeasures for suppressing power source fluctuations can be implemented relatively easily.

As described above, this invention has a phase correcting circuit in the stage before the data normalizing element and features a configuration which corrects the phase of the oscillation output and the phase of the read data with respect to each other based on the voltage of a loop filter.

An advantage of the present invention is that the pulse of the data bit can be accurately matched in the detection window of the window signal, thereby reducing read errors resulting from peak shifts are reduced. It is possible to merge the oscillation output pulse and the pulse of the read data signal, in spite of fluctuations containing high-frequency components such as peak shifts.

A further advantage of the present invention is that the advance margin and delay margin of the data bit are equal with respect to the window width, whereby read errors due to differences which occur between the amounts of delay in the data bit sequence and the window signal prior to the discriminator in a subsequent stage. It is possible to fine adjust the amount of phase shift according to the amount of phase change in response to relatively small phase changes in the read data signal caused by wow and flutter fluctuations.

A further advantage of the present invention is that the phase correction operation is the same in the event of jitter due to the occurrence of power source fluctuations, and, therefore, measures for suppressing power source fluctuations are simplified.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 1 is a block diagram showing a regenerator for a floppy disk device according to the prior art;

FIG. 2 is a block diagram showing a detail circuit configuration for the device of FIG. 1;

FIG. 3 is a timing diagram for signal waveforms in a normal operating state for the device of FIG. 1;

FIG. 4 is a timing diagram showing the timing of each of the signal waveforms when a peak shift occurs in the device of FIG. 1;

FIG. 5 is a block diagram showing a regenerator for a floppy disk device according to a first embodiment of the present invention;

FIG. 6 is a block diagram showing a circuit configuration for the device of FIG. 5;

FIG. 7 is a timing diagram showing signal waveforms for when a peak shift occurs in the device of FIG. 5;

FIG. 8 is a schematic showing a circuit configuration for a voltage-controlled delay circuit for the device of FIG. 5;

FIG. 9 is a schematic of a circuit configuration for a one-shot circuit and phase shifter used in the device of FIG. 5;

FIG. 10 is a timing diagram for the principal signal waveforms in the device of FIG. 5;

FIG. 11 is a block diagram of a regenerator for a floppy disk device according to a second embodiment of the present invention;

FIG. 12 is a timing diagram showing the relationship between an output voltage of a first low-pass filter, an output voltage of a second low-pass filter, and a phase error signal in the device of FIG. 11;

FIG. 13 is a timing diagram showing the timing of each of the signals in a normal operating state in the first embodiment;

FIG. 14 is a timing diagram for signals when wow and flutter occurs in the first embodiment; and FIG. 15 is a timing diagram showing the timing of each of the signals when wow and flutter occurs in the device of the second embodiment.

DESCRIPTION OF THE PREFERRED EMBODIMENTS

FIG. 5 illustrates a first embodiment of the present invention which is a regenerator circuit 50 comprising a floppy disk 52, a read/write head 54, a preamplifier 56, a one-shot multivibrator 58, and a phase locked loop (PLL) 60 having a phase comparator 62, a low-pass filter 64, and a voltage controlled oscillator (VCO) 66. Circuit 50 further comprises a voltage controlled delay circuit 68, a data normalizer 70, a discriminator 72, and a phase shifter 74 having a feedback point 76. System 50 is alternatively called a data recovery or data separator system by those skilled in the art. An MFM recording code sequence is recorded on the floppy disk 52. The recording code sequence is detected by magnetic head 54 and amplified by regenerator preamplifier 56 producing a signal "P". The one-shot multivibrator 58 converts signal "P" into a signal "RD" having a 25% duty cycle. PLL 60 outputs a synchronizing signal "$T_2$" with a phase that is synchronized with that of signal "RD". PLL 60 tracks low-frequency components such as those caused by wow and flutter fluctuations, but not high-frequency components such as peak shifts which occur in succession. PLL 60 compares the phase of signal "RD" to synchronizing signal "$T_2$". Signal "$T_2$" is obtained by dividing down signal "$T_1$" which is output by VCO 66. Phase comparator 62 produces a phase error signal "E". A low-pass filter 64 functions as the loop filter and passes a DC correction voltage "C" that varies in proportion to the phase error signal "E". VCO 66 varies the frequency of signal "$T_1$" up or down, according to correction voltage "C".

Signal "$T_1$" of VCO 66 drives voltage-controlled delay circuit 68 so that "$T_1$" can be selectively delayed by the application of correction voltage "C" (which is normally half of $V_{DD}$). An output signal "D" which is a delayed version of signal "$T_1$" is input into data normalizer 70. Read data signal "RD", however, is sent to phase shifter 74 where its phase is shifted a prescribed amount. A read data signal $\overline{RD}$ is output from phase shifter 74 and input to data normalizer 70. A code sequence "Z" of normalized read data and a window signal "W" are each generated by data normalizer 70. Discriminator 72 uses window signal "W" to detect whether or not a pulse in the detection code sequence "Z" is in a detection window, and it extracts a data bit sequence "X" from the read data signal "RD".

FIG. 6 illustrates that data normalizer 70 comprises a block A and a block B. Block A has the same configuration as data normalizer 20 shown in FIG. 1, and it produces the synchronizing signal "$T_2$" in synchronization with the phase of signal "RD" based on the oscillation output of VCO 66. Block A produces only the synchronizing signal "$T_2$" of phase synchronizing circuit 60 and does not produce normalized code sequence "Z" or window signal "W". Block B comprises a data normalizer and a phase correction circuit, and produces the code sequence "Z" of the normalized regenerated data and the window signal "W". Block B of data normalizer 70 comprises a divide-by-two divider 80, a pair of D-type flip flops 82 and 84, a two-input OR-gate 86, and a one-shot 88. Flip-flop 80 divides frequency "$f_2$" in half. Output signal "D" of voltage-controlled delay circuit 68 is connected to a clock input $C_4$. Phase shifter 74 inverts read data signal "RD", and delays it by a factor of one half $\pi$ or 90°. Flip-flop 82 receives signal $\overline{RD}$ from phase shifter 74 as a clock input $C_5$, and output $\overline{Q_4}$ from divider 80 as a data input $D_5$ and reset input $\overline{R_5}$. D-type flip-flop 84 receives signal $\overline{RD}$ at a clock input $C_6$ and output $Q_4$ from divider 80 as a data input $D_6$ and reset input $\overline{R_6}$. OR-gate 86 has two inputs, one connected to output $Q_5$ of flip-flop 82, and the other connected to output $Q_6$ of flip-flop 84. One-shot 88 detects the falling edge of the signal at the output of OR-gate 86 and generates narrow pulse width code sequence "Z" as detected data. Window signal "W" is generated from master output $\overline{M}$ of divider 80 and is delayed by a period of one half $\pi$, with respect to the output $Q_4$.

Referring now to FIG. 6, synchronizing signal "$T_2$" is supplied to one input terminal of phase comparator circuit 62, and is generated in block A of circuit 70 from oscillation output "$T_1$" of VCO 66. In FIG. 7, when a peak shift $\Delta\Phi$ ($\geq$90°) occurs and is delayed as shown by the pulse indicated by the hatched area in FIG. 7(D), synchronizing signal "$T_2$" has a falling edge (time $t_1$) at output $Q_1$ of divider 32. A phase error signal "E" is generated (detection phase amount: 180°−$\Delta\Phi$) such as shown in FIG. 7(J). This causes the DC correction voltage "C" to rise, for example, from a voltage half the power source voltage ($V_{DD}$) for the duration of the pulse of phase error signal "E", as shown in FIG. 7(K). When a phase shift occurs in signal "RD" in the prior art, the oscillation frequency of VCO 66 varies, but in this embodiment, it is fixed so that it does not follow peak shifts (large phase shifts). The pull-in range of VCO 66 is set relatively narrow so that it can follow wow and flutter fluctuations and other low-frequency components, but not follow relatively large peak shifts. Oscillation output "$T_1$" of VCO 66 is represented by a fixed frequency in FIG. 7(A). The DC voltage "C" of low-pass filter 26, controls voltage-controlled delay circuit 68. Applying voltage "C" on circuit 68 causes it to add a delay time of about one half the detection phase amount (180°−$\Delta\Phi$) to oscillation output "$T_1$". When a peak shift occurs in signal "RD", oscillation output "$T_1$" is corrected by a suitable delay based on the detection phase amount as described below, and delayed output "D" is generated, as shown in FIG. 7(F). Divider 80 receives delayed output "D" as clock input $C_4$, and generates both output $Q_4$ (FIG. 7(G)) and inverted output $\overline{Q_4}$ (FIG. 7(H)). The master output $\overline{M}$ generates window signal "W", and is shown in FIG. 7(L).

Read data signal "RD" is used to generate the phase-shifted read data signal $\overline{RD}$ whose phase has been shifted 90° by phase shifter 74, as shown in FIG. 7(D) and (I). Read data signal $\overline{RD}$ goes low with the falling edge of signal "RD" and then goes high automatically after 90° of the phase has elapsed. As a result, output $Q_6$ of flip-flop 80 is produced, as shown in FIG. 7(M), and is based on phase-shifted read data signal $\overline{RD}$ and output $Q_4$ of divider 80. Output $Q_5$ of flip-flop 82, shown in FIG. 7(N), is based on phase-shifted read data signal $\overline{RD}$ and inverted output $\overline{Q_4}$ of divider 80. Outputs $Q_6$ and $Q_5$ are combined in OR-gate 86 to produce signal "$T_3$" as shown in FIG. 7(O). Further, the code sequence of signal "$T_3$" is shaped by the narrow-pulse data code sequence "Z" in edge detection circuit 88.

The occurrence of a peak shift (with a phase delay of $\Delta\Phi$) causes a pulse of delayed output "D" (indicated by hatched area) to be delayed by a factor of the difference between 180° and $\Delta\Phi$, divided by two. The rising edge of the pulse (indicated by hatched area) of phase-shifted read data signal $\overline{RD}$ is delayed by a factor of $\Delta\Phi$−90°. Assuming the phase amount $\Delta\Phi$ is less than 120°, then the expression:

$$(180° - \Delta\Phi)/2 \geq \Delta\Phi - 90° \tag{1}$$

is valid, and since the rising edge of the pulse of delayed output "D" is behind the rising edge of the pulse of phase-shifted read data signal $\overline{RD}$, the data bit indicated by the hatched area in FIG. 7(N) correctly appears in output $Q_5$ near the center of a detection window width "w" of the window signal. The peak shift illustrated in FIG. 7 is for a case in which the phase delay $\Delta\Phi$ falls in the range 90°$\leq\Delta\Phi\leq$120°, but since the phase of window signal W is already delayed by 90° with respect to the phase of inverted output $\overline{Q_4}$, the correct data bit is generated, even for an advanced phase $\Delta\Phi$ (90°$\leq\Delta\Phi\leq$120°), due to the time axis symmetry of the signal. Of course, the correct data bit is also output when the phase is delayed or advanced less than 90°.

FIG. 8 illustrates that voltage controlled delay circuit 68 comprises a pair of current mirror circuits 90 and 92 whose mirror currents "i" are each controlled by correction voltage "C". Several CMOS inverters $INV_1$ through $INV_n$ are connected in series such that the individual delays of each inverter stage add to one another. This causes the phase of "$T_1$" to be delayed by a factor equal to the number of stages it traverses times the delay of each stage. MOS transistors ($F_{11}$, $F_{12}$)-($F_{n1}$, $F_{n2}$) control the source current of CMOS inverters $INV_1$-$INV_n$ using mirror current "i". The delay time $\Delta T_1(v)$ for each of the CMOS inverters is determined by the magnitude of the source current, which is dependent on the voltage "C" being applied. Each stage in the n-stage CMOS inverter is affected simultaneously. The pulse corresponding to oscillation output "$T_1$" is delayed by $n\Delta T_1(v)$ and is output as delayed output "D".

FIG. 9 shows details of one-shot circuit 58 and phase-shifter circuit 74. One-shot circuit 58 comprises a flip-flop that has its data input $D_7$ pulled up to $V_{DD}$. Signal "P" from regenerator preamplifier 56 clocks input $C_7$ via a terminal 97. The shaped signal "RD" (whose pulse width is one quarter the fundamental period) appears at flip-flop output $Q_7$. Phase-shifter 74 has a configuration similar to that of voltage-controlled delay circuit 68, and comprises current mirror circuits 94 and 96. Mirror current "i" is controlled by the control DC voltage continuously applied to terminal 76, Several CMOS inverters $INV_1$-$INV_n$ are connected in series to delay the phase of signal "RD". MOS transistors ($F_{11}$, $F_{12}$)-($F_{n1}$, $F_{n2}$) control the source currents of CMOS inverters $INV_1$-$INV_n$. The correction voltage (v) on terminal 76 is set so that the phase delay is nominally 90° ($\pi/2$), satisfying the condition:

$$n\Delta T_1(v) = 90° \qquad (2).$$

One-shot circuit 58 and phase shifter 74 can be integrated together in a single semiconductor integrated circuit. When read pulse "P" arrives at one-shot circuit 58, signal "RD" goes high with the rising edge of read pulse "P", as shown in FIG. 10(A). At a point delayed 90° ($\pi/2$) behind the rise of this pulse, phase-shifted read signal $\overline{RD}$ goes low. Signal "RD" goes low at the falling edge of read signal $\overline{RD}$, and read signal $\overline{RD}$ goes high at the falling edge of signal "RD".

FIG. 11 is a second embodiment of the present invention for a regenerator 100 similar to that of FIG. 5, except that a second low pass filter has been included. System 100 is alternatively called a data recovery or data separator system by those skilled in the art. Regenerator 100 comprises a floppy disk 102, a read/write head 104, a preamplifier 106, a one-shot multivibrator 108, and a phase locked loop (PLL) 110 having a phase comparator 112, a first low-pass filter 114, a second low pass filter 116, and a voltage controlled oscillator (VCO) 118. Regenerator 100 further comprises a voltage control delay circuit 120, data normalizer 122, a discriminator 124, and a phase shifter 126 having a feedback point 128. In phase synchronizing circuit 112 of this embodiment, first low-pass filter 114 and second low-pass filter 116 are connected in two stages, in series. The cut-off frequency of first low-pass filter 114 is higher than that of second low-pass filter 116. Low-pass filter 114 can be implemented in an integrated circuit comprising a capacitor and resistor, and/or an operational amplifier. Voltage $DC_1$, is output from low-pass filter 114, and supplied to the control input (gate of the current mirror circuit 90) of voltage-controlled delay circuit 120. Voltage $DC_2$ is output from low-pass filter 116 and is supplied to the control input of VCO 120 and terminal 128 of phase shifter 126. When a phase error signal "E" such as that shown in FIG. 12(C) occurs, a DC voltage $DC_1$ with a large voltage fluctuation such as that shown in FIG. 12(A) is generated, since the cut-off frequency of first low-pass filter 114 is high. The change in the amount of delay by voltage-controlled delay circuit 120 is, therefore, large. As a result, and as in the first embodiment above, the data bit will correctly appear in the window width even in spite of peak shifts. When a phase error signal "E" such as that shown in FIG. 12(C) occurs, a DC voltage $DC_2$ with a small voltage fluctuation such as that shown in FIG. 12(B) is generated, since the cut-off frequency of second low-pass filter 116 is low. Second low-pass filter 116 smooths DC voltage $DC_1$ so that VCO 120 will not follow peak shifts. Applying DC voltage $DC_2$ on terminal 128 of phase shifter 126 suppresses any reduction of the phase margin of the data bit due to irregular rotation of the spindle motor (extremely low frequency component compared to the frequency component of peak shifts). Suppressing phase margin reduction is discussed below.

FIG. 13 shows the normal waveforms for each of the signals when there are no peak shifts or wow and flutter. In FIG. 13(A), a data pulse "P" is detected every 2-microseconds. A pulse width one quarter of the fundamental period of 2-microseconds is generated. Output $Q_4$ and inverted output $\overline{Q_4}$ of divide-by-two divider 80 appear as shown in FIGS. 13(C) and (D). Signal "RD" goes high with the rising edge of data pulse "P" and has a pulse width one quarter of the fundamental period. Since there is no phase shift in signal "RD", the falling edge of phase-shifted read data signal $\overline{RD}$ is already delayed 90° (0.5 microseconds) behind the rising edge of signal "RD", as shown in FIG. 6, and goes high 0.5 microseconds later. Since the data bit occurs at the rising edge of phase-shifted read data signal $\overline{RD}$, the advance margin of the data bit pulse is 0.5 microseconds and the delay margin is 0.5 microseconds, with respect to window width "w".

Assuming a case in which floppy disk 102 speeds up due to a rotational irregularity, the period of data pulse "P" temporarily becomes 1.75 microseconds, as shown in FIG. 14(A). In the first embodiment, the pulse width of signal "RD" would remain 0.5 microseconds. This is because, as can be seen from FIG. 5, one-shot circuit 58 is reset by phase-shifted read data signal $\overline{RD}$ of phase shifter 74. Furthermore, the occurrence of phase error shortens the pulse width of oscillation output "$T_1$" of VCO 120, which, for example, becomes 0.4375 microseconds. Therefore, the pulse width of inverted output $\overline{Q_4}$ is shortened to 0.875 microseconds. However, since the interval, pulse width, between the falling edge and rising edge of the pulse of phase-shifted read data signal $\overline{RD}$ remains 0.5 microseconds, the advance margin of the data bit pulse with respect to the window width becomes 0.5 microseconds. The delay margin becomes 0.375 microseconds. Resulting in an imbalance between the advance margin and delay margin.

In the second embodiment, the amount of phase delay used by phase shifter 126 is not set at a uniform 90°. The amount of phase delay implemented by phase shifter 126 can be adjusted with respect to rotational irregularities and other low-frequency fluctuations. The DC voltage $DC_2$, which is output by second low-pass filter 116, is also supplied to terminal 128 of phase shifter 126. Assuming a case in which the disk 102 speeds up due to a rotational irregularity, the period of data pulse "P" temporarily becomes 1.75 microseconds, as shown in FIG. 15(A). Since this causes DC voltage $DC_2$ to gradually increase, as shown in FIG. 16(B), the amount of phase delay of phase shifter 126 is slightly reduced and the pulse width of signal "RD" becomes 0.4375 microseconds. The occurrence of phase error shortens the pulse width of oscillation output "$T_1$" of VCO 120 so that it becomes 0.4375 microseconds. The pulse width of inverted output $\overline{Q_4}$ is shortened to 0.875 microseconds, but since the interval, pulse width, between the falling edge and rising edge of the pulse of the phase-shifted read data signal $\overline{RD}$ is 0.4375 microseconds, the advance margin of the data bit pulse with respect to the window width is 0.4375 microseconds and the delay margin is 0.4375 microseconds. Therefore, a balance between the advance margin and delay is maintained. If changes in the DC components of the output voltages of first low-pass filter 114 and second low-pass filter 116 due to rotational irregularities are nearly the same, and the amounts of delay in phase shifter 126 and voltage-controlled delay circuit 120 due to the voltage changes are nearly the same, then margin balance is achieved. Since a reduction in the phase margins of peak shifts is suppressed, read errors do not easily occur. Also, since imbalance between phase margins due to power source fluctuations does not occur easily, measures for suppressing power source fluctuations can be simplified.

Phase shifter 126 and voltage-controlled delay circuit 120 have the same configuration, which makes their mutual delays equal. Both can be easily implemented together with semiconductor integrated circuit technology.

The second embodiment is configured to reduce read errors caused by peak shifts and balance phase margins in the event of wow and flutter fluctuations. When the voltage output by a low-pass filter is supplied to terminal 128 of phase shifter 126, phase margins can be balanced during wow and flutter fluctuations.

While the invention has been described in conjunction with several specific embodiments, it is evident to those skilled in the art that many further alternatives, modifications and variations will be apparent in light of the forgoing description. Thus, the invention described herein is intended to embrace all such alternatives, modifications, applications and variations as may fall within the spirit and scope of the appended claims.

What is claimed is:

1. Data regeneration apparatus for use in data storage systems to suppress errors in data recovery where the data is digitally recorded on and retrieved from an information recording medium in the form of pulses which may be subjected to peak shifts and frequency fluctuations induced by storage system operation, comprising:
    waveform shaping means for receiving and shaping data signals in the form of pulses from an information recording medium, and generating a shaped read data signal having a fundamental pulse period;
    phase synchronizing means connected to an output of the waveform shaping means for generating a synchronizing signal synchronized with the data fundamental pulse period having a loop filter;
    phase correction means connected to receive the synchronizing signal and an output of the loop filter, for adjusting the relative phase between said synchronization signal and the shaped read data signal in the presence of undesired frequency fluctuations, in response to an output voltage of the loop filter; and
    a data normalizer connected to receive at least one output from said phase correction means and receive said shaped read data signal and configured to generate a normalized read data signal and a window signal from the received read data signal in response to the phase correction means output.

2. The processor of claim 1 wherein the phase correction means comprises a voltage-controlled data phase shifting means for variably adjusting the amount of shift in the pulse phase of the read data signal in response to changes in an output voltage of the loop filter.

3. The processor of claim 1, wherein the loop filter comprises first-stage and second-stage low-pass filters having first and second cut-off frequencies, respectively, with the second cut-off frequency being lower than the first.

4. The processor of claim 1, wherein:
    said phase synchronizing means comprises:
        a phase comparator, a loop filter, and a voltage controlled oscillator connected in series with the voltage controlled oscillator having a pull-in frequency range adjusted to accommodate low-frequency fluctuations in the loop filter output; and
    said phase correction means comprises:
        phase shifting means connected to the loop filter for shifting the phase of a read data signal; and
        voltage-controlled delay means connected to the loop filter for imposing a variable amount of delay on the output of the voltage controlled oscillator in response changes in an output voltage from the loop filter.

5. The processor of claim 4, wherein the loop filter comprises:
    a first-stage low-pass filter having a first cut-off frequency with an output connected to said voltage controlled delay means, and
    a second-stage low-pass filter connected in series with the first-stage low-pass filter and having a second cut-off frequency lower than the first cut-off frequency with an output connected to said phase shifting means.

6. The processor of claim 4, wherein the loop filter comprises first-stage and second-stage low-pass filters having first and second cut-off frequencies, respectively, with the second cut-off frequency being lower than the first.

7. The processor of claim 6, wherein the phase correction means comprises:
    a voltage-controlled data phase shifter connected to the second-stage low-pass filter and being configured to provide a variable phase shift in the pulse phase of the read data signal in response to changes in the output voltage of the second-stage low-pass filter; and
    a voltage-controlled delay means connected to the first-stage low-pass filter and being configured to provide a variable amount of delay in the output pulse of the phase synchronizing means in response to the output voltage of the first-stage low-pass filter.

8. Data regeneration apparatus for use in data storage systems to suppress errors in data recovery where the data is digitally recorded on and retrieved from an information recording medium in the form of pulses which may be subjected to peak shifts and frequency fluctuations induced by storage system operation, comprising:
    waveform shaping means for receiving and shaping data signals in the form of pulses from an information recording medium, and for generating a shaped read data signal having a fundamental pulse period;
    phase synchronizing means connected to an output of the waveform shaping means for generating a synchronization signal synchronized with the data fundamental pulse period, and having a loop filter comprising a first low pass filter connected in series with a second low pass filter, said first low pass filter having a higher cut-off frequency than said second low pass filter;

phase correction means connected to receive the synchronization signal and a voltage signal from a preselected source, for adjusting the relative phase between said synchronization signal and the shaped read data signal in the presence of undesired frequency fluctuations, in response to the voltage level of said voltage signal; and a data normalizer connected to receive at least one output from said phase correction means and receive said shaped read data signal and configured to generated a normalized read data signal and a window signal from the received read data signal in response to the phase correction means output;

wherein said preselected source is an output of said first low pass filter.

* * * * *